United States Patent
Ducharme et al.

[11] Patent Number: 5,997,155
[45] Date of Patent: Dec. 7, 1999

[54] INTEGRATING PROJECTION OPTIC

[75] Inventors: Alfred D. Ducharme, Haverhill, Mass.; Takashi Nakamura, Oakland, Calif.

[73] Assignee: Physical Sciences, Inc., Andover, Mass.

[21] Appl. No.: 08/828,586

[22] Filed: Mar. 31, 1997

[51] Int. Cl.[6] ................................. F21V 7/00
[52] U.S. Cl. .................. 362/298; 362/302; 362/346; 362/551
[58] Field of Search .................. 362/32, 304, 247, 362/346, 320, 321, 298, 302

[56] References Cited

U.S. PATENT DOCUMENTS

| | | |
|---|---|---|
| 2,143,435 | 1/1939 | Dietrich . |
| 3,192,376 | 6/1965 | Najimian, Jr. et al. . |
| 3,561,145 | 2/1971 | Shotwell . |
| 3,588,492 | 6/1971 | Pollock . |
| 3,711,701 | 1/1973 | Squyres . |
| 3,964,015 | 6/1976 | Collins . |
| 4,111,548 | 9/1978 | Pechev et al. ............... 355/50 |
| 4,232,971 | 11/1980 | Suga . |
| 4,245,281 | 1/1981 | Ziaylek, Jr. . |
| 4,252,416 | 2/1981 | Jaccard . |
| 4,257,084 | 3/1981 | Reynolds . |
| 4,264,948 | 4/1981 | Cherouge . |
| 4,277,817 | 7/1981 | Hehr . |
| 4,282,560 | 8/1981 | Kringel et al. . |
| 4,367,519 | 1/1983 | Houghton et al. . |
| 4,441,783 | 4/1984 | Houghton et al. . |
| 4,623,225 | 11/1986 | Forkner . |
| 4,649,545 | 3/1987 | Lee et al. . |
| 4,706,788 | 11/1987 | Inman et al. . |
| 4,815,858 | 3/1989 | Snail . |
| 4,827,484 | 5/1989 | Cook, Jr. . |
| 4,868,383 | 9/1989 | Kurtz et al. . |
| 4,873,693 | 10/1989 | Cook, Jr. . |
| 4,912,720 | 3/1990 | Springsteen . |
| 4,988,205 | 1/1991 | Snail . |
| 5,268,749 | 12/1993 | Weber et al. . |
| 5,289,356 | 2/1994 | Winston . |
| 5,309,339 | 5/1994 | Webb . |
| 5,402,734 | 4/1995 | Galpin et al. . |
| 5,441,053 | 8/1995 | Lodder et al. ............... 128/664 |
| 5,462,705 | 10/1995 | Springsteen . |
| 5,479,009 | 12/1995 | Jablonski et al. . |
| 5,488,473 | 1/1996 | Springsteen et al. . |
| 5,517,315 | 5/1996 | Snail et al. . |
| 5,519,534 | 5/1996 | Smith et al. . |
| 5,537,203 | 7/1996 | Carr . |

FOREIGN PATENT DOCUMENTS

| | | |
|---|---|---|
| 1533153 | 7/1968 | France . |
| 1195190 | 6/1965 | Germany . |
| 1526257 | 9/1978 | United Kingdom . |

*Primary Examiner*—Nimeshkumar D. Patel
*Assistant Examiner*—Michael O. Smith

[57] ABSTRACT

A method and apparatus for projecting a uniform projection of light by using a diffusive optic and non-imaging optic to receive light beams and uniformly distribute the light beams on a target. The uniform distribution of light diverges according to a pre-designed angle. The device allows for the use of multiple light sources which may be remotely located from the projection device. The projection device may be portable.

20 Claims, 5 Drawing Sheets

INTEGRATING PROJECTION OPTIC

FIELD OF THE INVENTION

This invention relates to a method and apparatus for providing a uniform projection of light. More specifically, this invention relates to a method and apparatus for providing a uniform projection of light using an integrating sphere and a compound parabolic reflector.

BACKGROUND OF THE INVENTION

The uniform projection of light has traditionally been performed using the combination of a costly refractive lens and a parabolic concentrator. The concentrator is used to collect the light from a single lamp and direct it through a refractive lens system. The resulting distribution of light is governed by the geometry of the lamp element and the propagation of the light through the refractive optics. This method yields a light distribution with significant fluctuations in light intensity throughout the target plane. Enhancements such as refractive integrating and diffusing devices improve the output uniformity but reduce the overall efficiency of the system. Additionally, the spectral content of the light at the target plane and the total optical power projected are restricted since the optics are designed to use only a single lamp.

SUMMARY OF THE INVENTION

It is therefore an object of this invention to overcome these and other drawbacks of the prior art.

It is another object of this invention to provide a method and apparatus for projecting a uniform distribution of light.

It is another object of this invention to provide a method and apparatus for projecting a uniform distribution of light using a plurality of light sources as inputs.

It is another object of this invention to provide a method and apparatus for projecting a uniform projection of light which selectively combines the light from a plurality of light sources to control characteristics (e.g., color) of the uniformly distributed light.

It is a further object of this invention to provide a uniform projection of light with a portable projector that is remote from the one or more light sources that feed that projector.

According to one embodiment of the present invention, these and other objects of the invention are achieved by providing a projection device that includes both a diffusive optic and a non-imaging optic. A diffusive optic, such as an integrating sphere, is used to mix or diffuse the output of one or more light sources. An exit port of the diffusive optic behaves as an extended light source for the non-imaging optic. The output from the diffusive optic fills the non-imaging optic, such as a compound parabolic concentrator, resulting in a uniform projection of the source light. The divergence of the light exiting the non-imaging optic can be determined from the collection angle of the non-imaging optic.

According to other aspects of the invention, the input to the projector can be one or more light sources or one or more fiber optics, the other end of the fiber optic(s) being fed by one or more light sources. In either case, the one or more light sources can have different characteristics (e.g., color, intensity, etc.) and can be selectively combined to control characteristics of the uniformly distributed output beam.

DETAILED DESCRIPTION OF THE PREFERRED EMBODIMENTS

Figure 1:
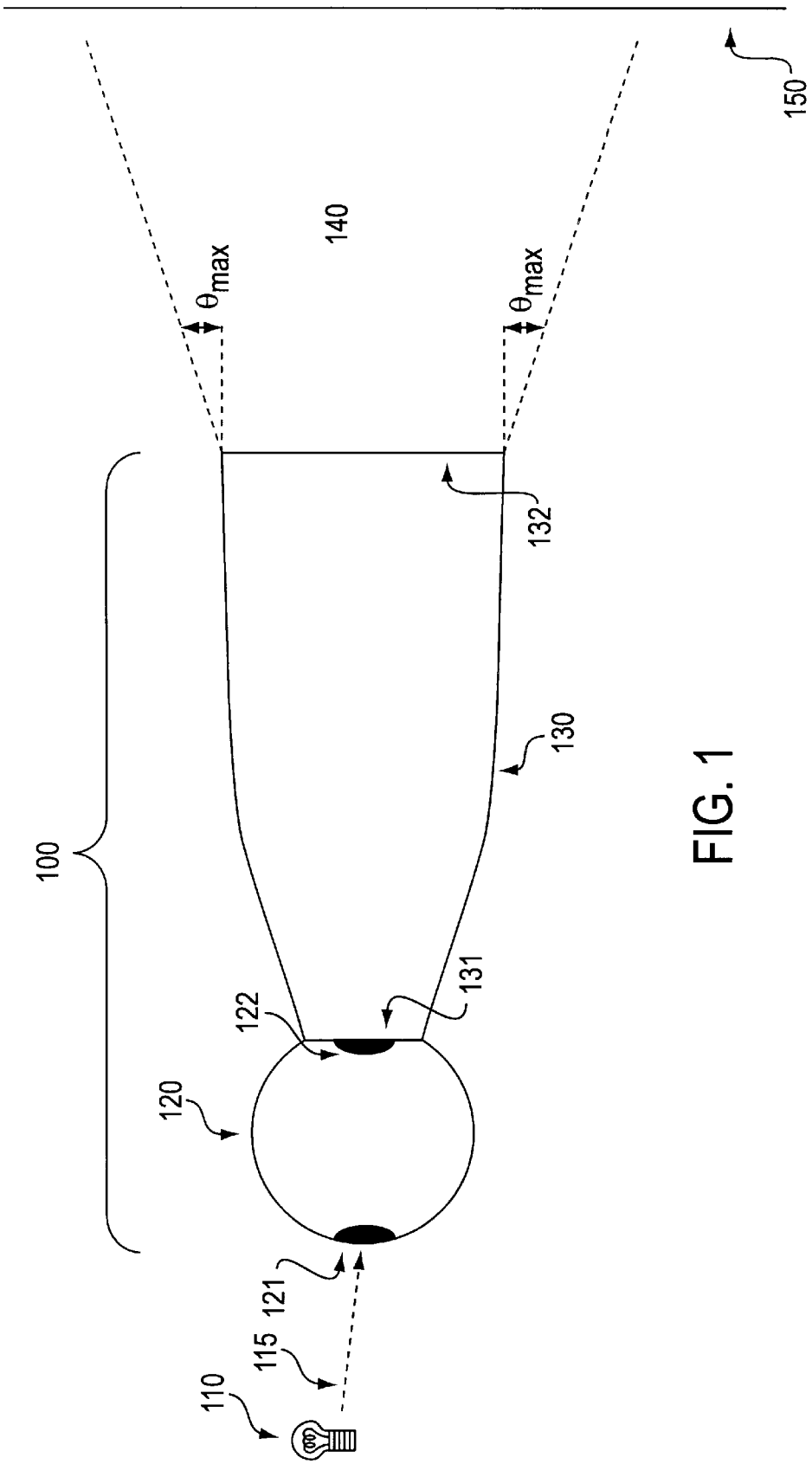
FIG. 1 is a diagram of one embodiment of an integrating projection optic according to the present invention.

Referring to FIG. 1, an integrating projection optic 100 consists of a light source 110, a diffusive optic 120, and a non-imaging optic 130. The light source 110 may be, but is not limited to, a LED, a Xenon arc, Quartz Halogen filament, or a laser. The light beam 115 generated by the light source is directed to an input aperture 121 of the diffusive optic 120. Diffusive optic 120 uniformly disperses the light beam from the light source. Light exits diffusive optic 120 at exit aperture 122. This exiting light continues to disperse as it leaves diffusive optic 120.

Diffusive optic 120 may be an integrating sphere. The inner surface of the integrating sphere has a coating of a material with a Lambertian quality; that is, the surface has the directional characteristic of distributing the reflected light uniformly over the entire sphere's inner surface. Thus, once a light beam enters the sphere through its input aperture, the light beam is evenly distributed over the entire inner sphere surface, including the exit aperture.

Figure 2:
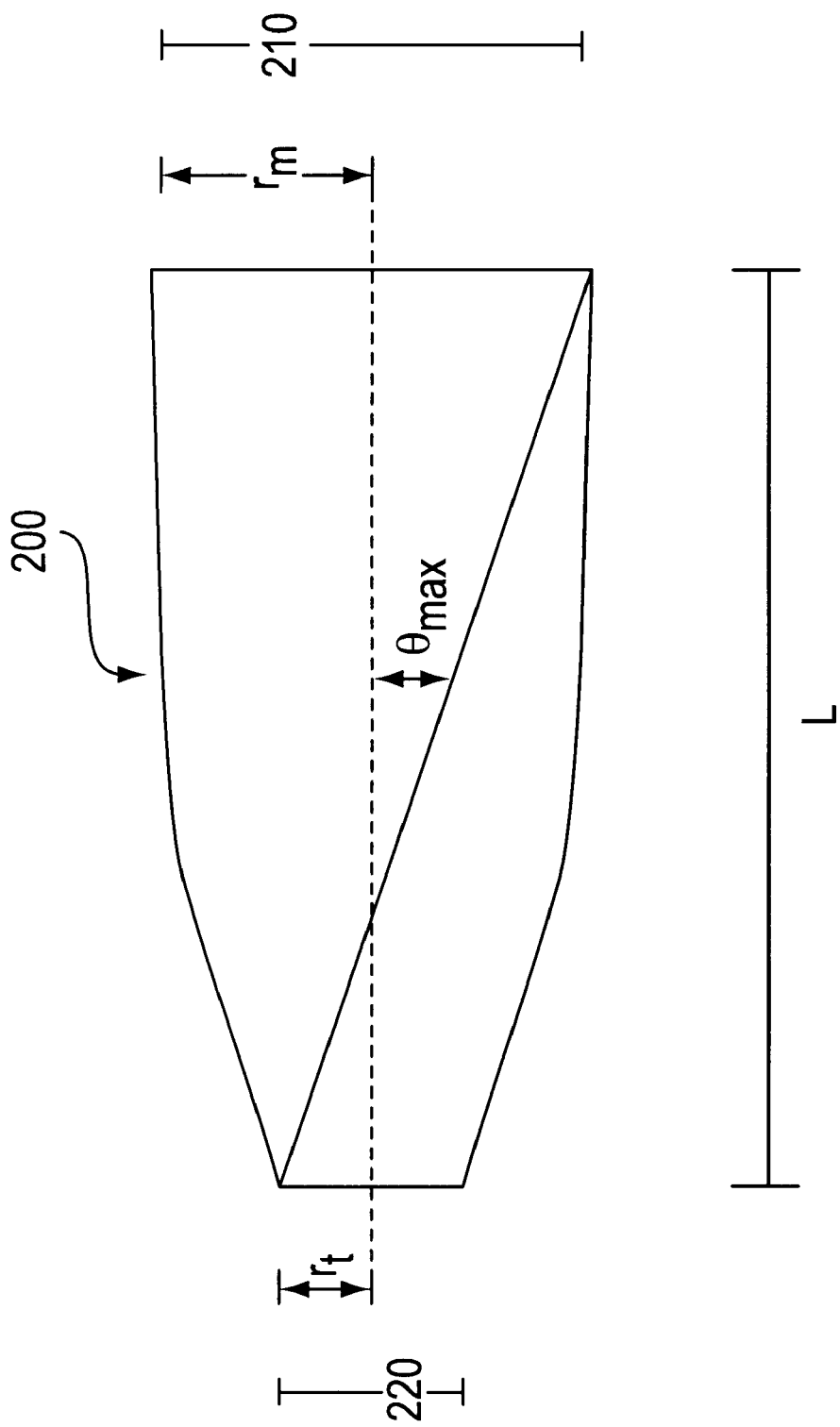
FIG. 2 is a diagram of a compound parabolic concentrator.

The light flux passing through the exit aperture 122 preferably immediately enters the non-imaging optic 130 through its opening 131 and then exits through exit 132. Non-imaging optic 130 may be a compound parabolic concentrator (CPC). Referring to FIG. 2, the CPC 200 is a cone-shaped object, and consists of a large opening, referred to as the mouth 210 and having a radius $r_m$, a smaller opening, referred to as the throat 220 and having a radius $r_t$, and a specified length L. The ratio of $r_m$ to $r_t$ defines the collection angle, $\theta_{max}$ of the CPC. The parameters $r_m$, $r_t$, L, and $\theta_{max}$ are related by the equations:

$$\theta_{max} = \sin^{-1}(r_t/r_m) \quad (1)$$

and $$L = (r_t + r_m)/\tan(\theta_{max}) \quad (2)$$

Therefore, the CPC can be designed to achieve a desired collection angle from equations (1) and (2). A smaller collection angle will result in a smaller divergence of light once the light leaves the CPC.

In operation, Lambertian light flux, such as the output of diffusive optic 120, fills the throat 220 of the CPC. The CPC acts as an angle limiter, preventing light passing herethrought from diverging with an angle greater than $\theta_{max}$. Referring again to FIG. 1, CPC 130 collects most or all of the Lambertian light flux from the output of diffusive optic 120. The reflective inner surface and geometry of CPC 130 converts the collected flux to a uniform field of light 140. The field of light 140 has a maximum divergence angle of $\theta_{max}$ which is projected onto target 150.

Figure 3:
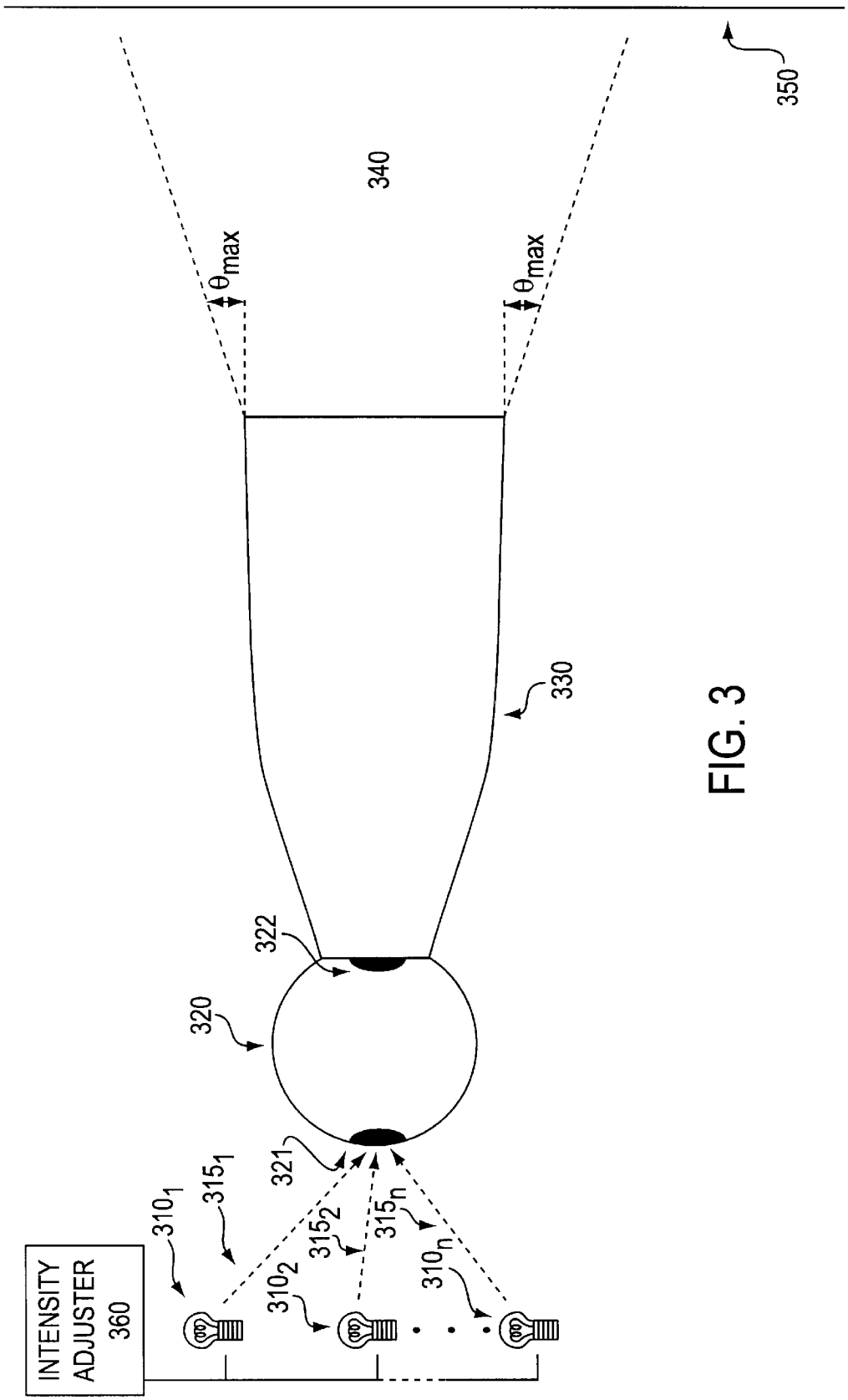
FIG. 3 is a diagram of another embodiment of an integrating projection optic according to the present invention.

In another embodiment of the invention, it is preferable that a plurality of light sources serve as inputs to the integrating sphere. One of the properties of an integrating sphere is its ability to mix the light from several sources into a uniform output. Referring to FIG. 3, multiple light sources $310_1$, $310_2$ ... $310_n$ provide multiple light beams $315_1$, $315_2$ ... $315_n$ which are directed into the input aperture 321 of integrating sphere 320. Input aperture 321 may comprise multiple input ports. The multiple light beams $315_1$, $315_2$ ... $315_n$ are then uniformly distributed over the sphere's inner surface in accordance with Lambert's Law. The output of the integrating sphere from exit aperture 322 is a Lambertian light flux which is polychromatic in proportion to the intensity of the light from each of light sources $310_1$, $310_2$ ... $310_n$, and, as discussed earlier, diverges uniformly from the non-imaging optic 330 at an pre-designed angle, $\theta_{max}$. The reflective inner surface and geometry of CPC 330 converts the collected flux to a uniform field of light 340. The field of light 340 has a maximum divergence angle of $\theta_{max}$ which is projected onto target 350. This characteristic makes this device very attractive for stage lighting, as one single device with multiple light sources can provide a plurality of colors. In addition, by varying the intensity of each light source, smooth transitions between colors can be achieved. Light source $310_1$–$310_n$ intensity adjustment may be accomplished in any known manner as represented by intensity adjuster 360.

Figure 4:
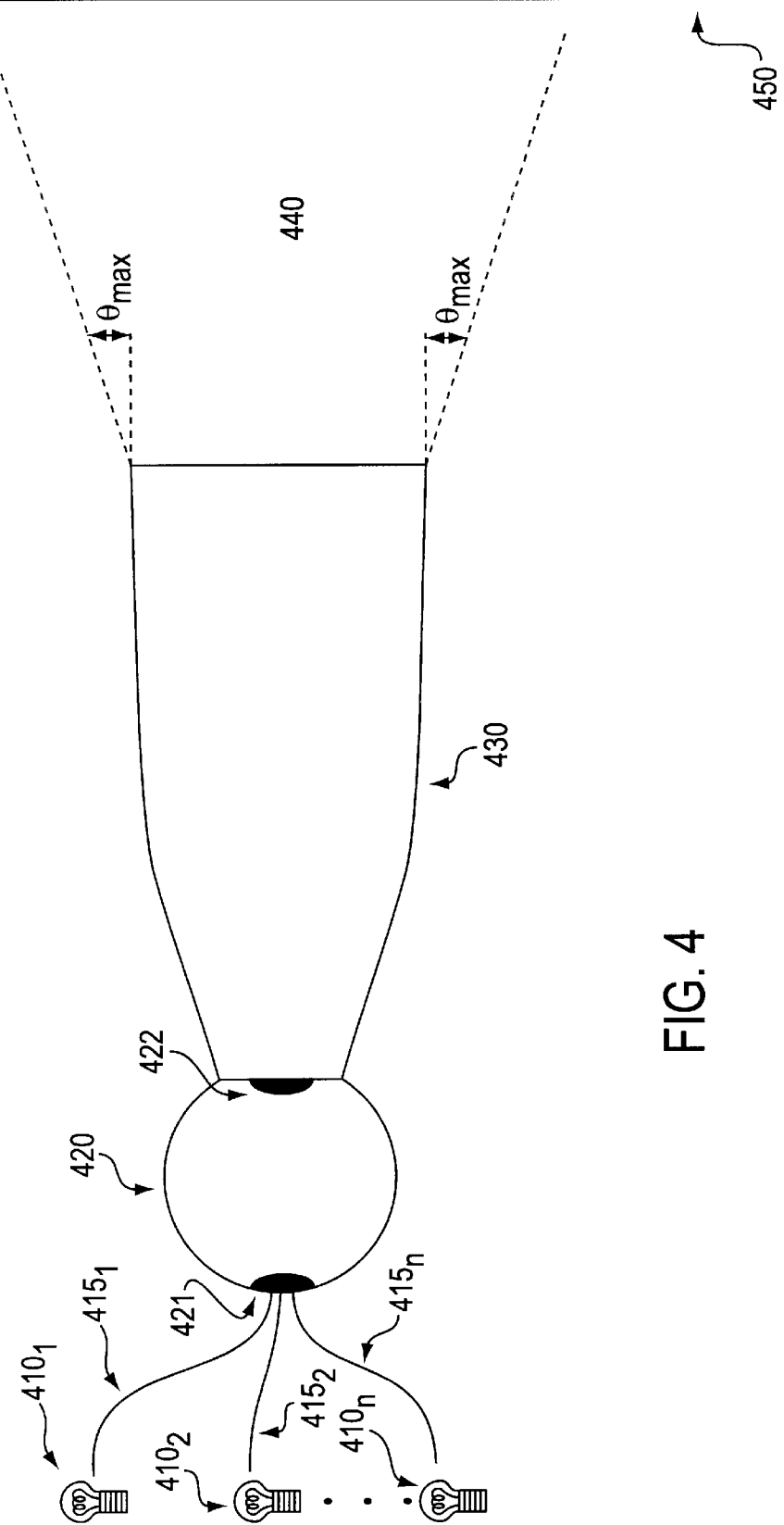
FIG. 4 is a diagram of another embodiment of present invention.

As shown in the embodiment of FIG. 4, the light beams from light sources $410_1$, $410_2$, ... $410_n$ are provided to the diffusive optic 420 through a light guide such as fiber optic $415_1$, $415_2$, ... $415_n$. The light travels along the light guide or transparent materials which terminate at the input aperture of the diffusive optic. The reflective inner surface and geometry of CPC 430 converts the collected flux to a uniform field of light 440. The field of light 440 has a maximum divergence angle of $\theta_{max}$ which is projected onto target 450.

Figure 5:
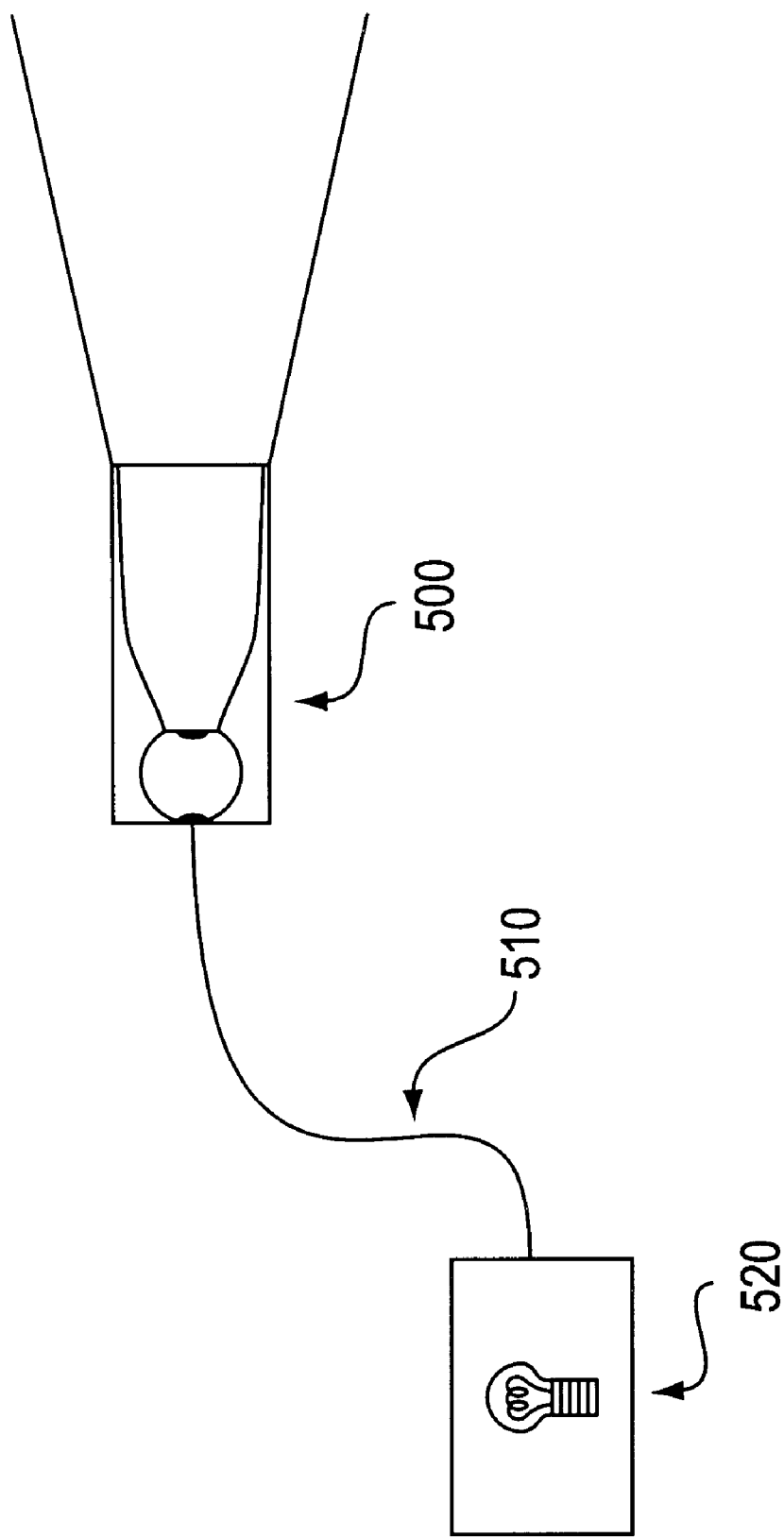
FIG. 5 is a diagram of another embodiment of the present invention.

There are several advantages to the embodiment shown in FIG. 4. First, the use of a transparent material to transmit light allows the input aperture size of the diffusive optic to be reduced, which increases the efficiency of the system. Second, the use of light guides promotes greater versatility. Large, remotely located light sources can be used while keeping the projection optics small, lightweight, and easily positioned Referring to FIG. 5, in another embodiment of this invention, the projection device 500 is portable. The device 500 is equipped with a long light guide 510 for projecting the light of light source 520. This allows the user to use the device as a flashlight. In another embodiment of the invention, the light source is portable, possibly carried in a backpack. This allows for the power of the larger light source to be concentrated in a uniform beam.

There are many potential applications for uniform light projectors, such as uniform solar simulators used in exposure testing of electrical devices, a new projection optic for both high and low power illuminators such as flashlights and searchlights, combining multicolor lamps, delivery of uniform UV light for photo-polymerization applications, stage lighting, large-area IR illumination for unobtrusive searches from aircraft, ships, or terrestrial platforms in support of law enforcement, and area array calibration sources for terrestrial, airborne, or spaceborne platforms.

Although the present invention has been described in detail, it should be understood that various changes, substitutions, and alterations can be made without departing from the intended scope as defined by the appended claims.

We claim:

1. A device for projecting a uniform distribution of light comprising:
    at least one light source for producing a light beam;
    a diffusive optic, said diffusive optic having an input aperture and an output aperture, wherein said diffusive optic is positioned to receive said light beam at said input aperture and produce a Lambertian flux at said output aperture;
    transmitting means for transmitting said light beam from said light source to said diffusive optic; and,
    a non-imaging optic, said non-imaging optic having an entrance and an exit wherein said entrance is positioned to receive said Lambertian flux light output from said output aperture, and wherein said exit outputs said Lambertian flux as a uniform distribution of light.

2. The device for projecting a uniform distribution of light of claim 1 wherein said transmitting means projects said light beam through a medium into said input aperture.

3. The device for projecting uniform distribution of light of claim 2 wherein said medium is air.

4. The device for projecting a uniform distribution of light of claim 1 wherein said transmitting means comprises at least one light guide.

5. The device for projecting a uniform distribution of light of claim 4 wherein said at least one light guide comprises at least one fiber optic.

6. The device for projecting a uniform distribution of light of claim 1 wherein said diffusive optic comprises an integrating sphere.

7. The device for projecting a uniform distribution of light of claim 1 wherein said non-imaging optic comprises
    a compound parabolic concentrator having a pre-designed angle, wherein said pre-designed angle is the collection angle of the compound parabolic concentrator.

8. The device for projecting a uniform distribution of light of claim 1 wherein said device for projecting a uniform distribution of light is portable.

9. The device for projecting a uniform distribution of light of claim 1 wherein said at least one light source is remotely located from said diffusive optic.

10. The device for projecting a uniform distribution of light of claim 1 wherein said at least one light source comprises
    multicolor light sources comprising:
        at least one red light source;
        at least one blue light source; and,
        at least one green light source,
    wherein the intensity of said multicolor light sources is adjustable.

11. The device for projecting a uniform distribution of light of claim 10 wherein said multicolor light sources are uniformly mixed by said diffusive optic.

12. A method of providing a uniform distribution of light, comprising the steps of:
    receiving at least one light beam;
    distributing said at least one light beam in a Lambertian light flux;
    limiting the divergence angle of said light flux to produce a limited light flux; and
    projecting said limited light flux onto a target.

13. The method of providing a uniform distribution of light of claim 12 wherein said step of receiving at least one beam of light comprises projecting a light beam through a medium.

14. The method of providing a uniform distribution of light of claim 13 wherein said medium is air.

15. The method of providing a uniform distribution of light of claim 12 wherein said step of receiving at least one beam of light comprises passing said at least one light beam through at least one light guide.

16. The method of providing a uniform distribution of light of claim 15 wherein said at least one light guide comprises at least one fiber optic.

17. The method of providing a uniform distribution of light of claim 12, further comprising the step of mixing said at least one light beam uniformly.

18. A method of providing a uniform distribution of light of varying color, comprising the steps of:

producing at least one light beam;

adjusting the intensity of said at least one light beam;

receiving said at least one light beam;

uniformly mixing said at least one light beam;

distributing said at least one light beam in a Lambertian light flux;

limiting the divergence angle of said light flux; to produce a limited light flux, and projecting said limited light flux onto a target.

19. The method of providing a uniform distribution of light of claim 18 wherein said step of producing at least one light beam comprises producing at least one red light source;

producing at least one green light source; and, producing at least one blue light source.

20. A device for projecting a uniform distribution of light comprising:

at least one light source for producing a light beam;

a diffusive optic having an input aperture and an output aperture;

transmitting means for transmitting said light beam from said light source to said diffusive optic; and, a non-imaging optic having an input and an exit, said input positioned to receive light output from said diffusive optic wherein said input has a radius and said exit has a radius and said input radius is smaller than said exit radius and said non-imaging optic transmits said light beam with a maximum angle of divergence defined by the ratio of said input radius divided by said exit radius.

* * * * *